(12) United States Patent
Gross et al.

(10) Patent No.: US 7,836,298 B2
(45) Date of Patent: Nov. 16, 2010

(54) SECURE IDENTITY MANAGEMENT (75) Inventors: Thomas R. Gross, Zurich (CH); Birgit M. Pfitzmann, Samstagern (CH)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 11/565,250

(22) Filed: Nov. 30, 2006

(65) Prior Publication Data
US 2010/0064134 A1 Mar. 11, 2010

(30) Foreign Application Priority Data
Dec. 23, 2005 (EP) ................... 05112930

(51) Int. Cl.
*H04L 29/06* (2006.01)
(52) U.S. Cl. .................. 713/155; 713/176; 713/182
(58) Field of Classification Search ............... 713/176, 713/155, 182
See application file for complete search history.

(56) References Cited

U.S. PATENT DOCUMENTS

| 7,207,058 B2* | 4/2007 | Barrett ................. 726/4 |
| 7,240,362 B2* | 7/2007 | Pfitzmann et al. ........... 726/2 |
| 7,610,390 B2* | 10/2009 | Yared et al. .............. 709/229 |
| 2003/0149781 A1* | 8/2003 | Yared et al. .............. 709/229 |
| 2004/0064687 A1* | 4/2004 | Pfitzmann et al. ........... 713/100 |
| 2004/0128558 A1* | 7/2004 | Barrett .................. 713/202 |
| 2005/0154913 A1* | 7/2005 | Barriga et al. ............ 713/201 |
| 2005/0177730 A1* | 8/2005 | Davenport et al. ............ 713/182 |
| 2007/0130460 A1* | 6/2007 | Pfitzmann et al. ........... 713/168 |
| 2008/0263225 A1* | 10/2008 | Nadalin et al. ............ 709/242 |
| 2009/0037727 A1* | 2/2009 | Pritikin ................. 713/156 |

FOREIGN PATENT DOCUMENTS

| JP | 11-212912 | 8/1999 |
| JP | 2002-007345 | 1/2002 |
| JP | 2002-149610 | 5/2002 |
| JP | 2005-149239 | 6/2005 |

* cited by examiner

*Primary Examiner*—Edan Orgad
*Assistant Examiner*—Bradley Holder
(74) *Attorney, Agent, or Firm*—Gibb I.P. Law Firm, LLC (57) ABSTRACT

The invention relates to a method for providing an identity-related information (IRI) to a requesting entity (50) by means of an identity provider (40). The invention comprises: a first authenticity reference part generation step (IVa), comprising the generation of a first authenticity reference part (art 1) by the identity provider (40); a first authenticity reference communication step (IVb, IVd) between the client application (30) and the identity provider (40) comprising the communication of the first authenticity reference part (art 1); a second authenticity reference part generation step (VI), comprising the generation of a second authenticity reference part (art 2) by the identity provider (40); a second authenticity reference communication step (VIII, IX) between the identity provider (40) and the requesting entity (50) by means of the first communication protocol comprising the communication of the second authenticity reference part (art 2) and in the referrer element the communication of the first authenticity reference part (art 1).

14 Claims, 6 Drawing Sheets

GET /SSOpage?...art1...
Host: identityprovider.org
User-Agent: XYZ/1.0.8
Connection: keep-alive
Referrer: https://identityprovider.org/ ISTpage
Authentication: usercredentials (e.g., username and password)

Fig. 4a

POST /SSOpage?...art1...
Host: identityprovider.org
User-Agent: XYZ/1.0.8
Connection: keep-alive
Referrer: https://identityprovider.org/ ISTpage

*HTML form with user credentials (e.g., username and password)*

Fig. 4b

HTTP/1.1 302 Object Moved
Location: https://dc.requestingentity.org/ACSpage?... art2

Fig. 4c

GET /ACSpage?...art2...
Host: dc.requestingentity.org
User-Agent: XYZ/1.0.8
Connection: keep-alive
Referrer: https://identityprovider.org/SSOpage?...art1...

Fig. 4d

HTTP1/ 202 OK

*Result HTML page*

Fig. 4e

GET /OtherPage
Host: otherhost.org
User-Agent: XYZ/1.0.8
Connection: keep-alive
Referrer: https:// dc.requestingentity.org/ACSpage?...art2...

SECURE IDENTITY MANAGEMENT

TECHNICAL FIELD

The present invention is related to a method and system for providing identity related information about a user to a requesting entity by means of an identity provider.

BACKGROUND OF THE INVENTION

Identity management in its widest sense means management of all the personal information about a person, including at least all the person's digital relations. Over the next decade, identity management systems in this wide sense are likely to evolve. Short-term, identity management is typically said for web single sign-on with the transfer of a small amount of data about a person.

The main business case is a general boost of electronic business: Identity management is an infrastructure issue where a standard, like the Internet and web standards, may benefit almost all parties.

Single sign-on enables a person or user to log in to different organizations or services while remembering only one password. Furthermore, single sign-on protocols allow client applications to identify themselves to other applications with whom they had not a priori exchanged any common data, such as keys. Usually, many users choose the same username and password with all the organizations or services. There are two problems with this: Each service can impersonate the user towards the others. This may be acceptable for the services of one enterprise, but even there one would prefer better modularization. And clearly it is not acceptable for a user's overall web experience.

Single sign-on is widely seen as a necessary infrastructure to make electronic business on the Internet easier and to allow widespread use of the emerging Web Services. It may also evolve into more general identity management, e.g., for exchanging additional information about a person once the identity has been established.

Recently, single sign-on solutions are known, for example, by Microsoft Corporation's Passport system (URL: http://www.passport.com), by the OASIS (Organization for the Advancement of Structured Information Standards) standardization of the Security Assertion Markup Language (SAML) (URL: http://www.oasis-open.org/committees/security/docs), and the Liberty Alliance Project's recent specifications (URL: http://www.projectliberty.org). An aspect in the Liberty specifications is that detailed protocols are provided not only for browsers as client applications, but also more efficient protocols for other, more powerful client applications. Older related schemes in this setting are classical three-party authentication protocols.

Classical three-party client authentication protocols like Kerberos, Needham-Schroeder all start with a key-exchange or key-establishment protocol and then require the client application to use this key for encryption and authentication. In other words, a third party that can identify the client application by some a-priori exchanged information, such as a password, secret key, or confirmed public key, typically generates a new secret key for communication between the client application and its partner entity, which herein is called "requesting entity", and establish this secret key securely to both these entities. There is a great variety of protocols for carrying out this secure transfer of the secret key.

Federated identity management proposals such as the Security Assertion Markup Language (SAML) enable a reduction of user management costs by savings in password helpdesks, user management, and user deletion. SAML features browser-based profiles that only rely on a standard web browser to carry out identity federation, e.g., by means of single sign-on. These protocols complement the general advantages of federated identity management solutions with the property of being zero-footprint, i.e., not requiring installation of additional client software. Therefore, browser-based profiles are cost-efficient to deploy. However, designing secure protocols with a standard web browser as the client is not trivial. The browser, not being aware of the protocol it participates in, has a predefined behavior, reacts to predefined messages and generates information flow both to the underlying operating system and to communication partners. Especially the security of protocols that transfer confidential information through a browser's Uniform Resource Location (URL) is put at stake by this protocol-unaware behavior of a standard web browser. The browser/artifact profiles of SAML belong to this class of protocols, because they issue a random artifact as reference to a security token and transport it via the browser redirect URL.

In the meantime, SAML has advanced to Version 2.0. The structure and naming in the standards has also slightly changed, hence the corresponding protocol (in the terminology of security protocol research) is now the SAML V2.0 Web Browser SSO/Response/Artifact Feature.

It is an object of the invention to provide improved solutions for identity management.

SUMMARY AND ADVANTAGES OF THE INVENTION

The present invention is directed to methods, a system, a requesting entity, an identity provider and a computer program as defined in independent claims. Further embodiments of the invention are provided in the appended dependent claims.

According to one aspect of the present invention, there is presented a method for providing an identity-related information to a requesting entity by means of an identity provider, wherein a client application is provided for the communication of a user with the requesting entity and with the identity provider, wherein the client application uses a first communication protocol, wherein the first communication protocol comprises a referrer function according to which a communication message may comprise a referrer element with information about at least one previous communication step, the method comprising:

authenticating the user to the identity provider, a first authenticity reference part generation step, comprising the generation of a first authenticity reference part by the identity provider, a first authenticity reference communication step between the client application and the identity provider comprising the communication of the first authenticity reference part a second authenticity reference part generation step, comprising the generation of a second authenticity reference part by the identity provider, a second authenticity reference communication step between the identity provider and the requesting entity by means of the first communication protocol comprising the communication of the second authenticity reference part and in the referrer element the communication of the first authenticity reference part, a request step wherein the requesting entity sends the first and the second authenticity reference part or a secure function of the first and the second authenticity reference part to the identity provider, a response step wherein the identity provider sends the identity related information to the requesting entity.

This method has the advantage of a significantly enhanced security. In addition it is easy and efficient to implement. By means of issuing at least two authenticity reference parts, the first authenticity reference part and the second authenticity reference part, it is ensured that an adversary cannot act on behalf of the user to the requesting entity if he only gets one of the two authenticity reference parts.

The term user should be understood in a broad way. A user is any entity or person whose identity is managed. The term user should also include a client of a user, e.g. a specific software application.

According to various embodiments of the invention there are different possibilities to perform the request step.

One possibility is to send the first and the second authenticity reference part to the identity provider in the request step. In this case after the generation of the first and the second authenticity reference part the identity provider stores them in a database as a pair and if the identity provider receives in the request step a pair of authenticity reference parts, it looks up in the database if a corresponding pair is stored. If this is the case, he sends the corresponding identity related information to the requesting entity. Otherwise an error message may be sent.

Another possibility is to use a secure function of the first and the second authenticity reference part. A secure function should be understood as a function which ensures that it is impossible or at least nearly impossible for an adversary to reconstruct the result of this function, which is calculated from the first and the second authenticity reference part, from only one of the authenticity reference parts. In this case after the generation of the first and the second authenticity reference part the identity provider calculates and determines respectively a main authenticity reference. This main authenticity reference is calculated by means of the secure function from the first and the second authenticity reference part. Then the identity provider stores the main authenticity reference. If the requesting entity receives in the second authenticity reference communication step the first and the second authenticity reference part, it calculates and determines respectively the main authenticity reference by means of the very same secure function or a corresponding secure function. This means that in this case, the identity provider, as well as the requesting entity, knows the same secure function or the identity provider knows a secure function and the requesting entity knows a corresponding secure function. The use of a corresponding secure function at the side of the requesting entity allows public key cryptography. In the request, step the requesting entity sends the main authenticity reference to the identity provider. The identity provider looks up in his database if there is a corresponding main authenticity reference stored. If this is the case, he sends the corresponding identity related information to the requesting entity.

The invention can be applied to various forms of communication protocols. In particular, it is applicable to communication protocols comprising referrer functions according to which a communication message comprises multiple referrer elements with information about two or more previous communication steps. If the referrer element comprises information about two previous communication steps, the generation of three authenticity reference parts can ensure a secure authentication. In general, if the referrer element comprises information about n-previous communication steps, wherein n is a natural number, the generation of n+1 authenticity reference parts can ensure a secure authentication.

Under the term identity-related information (RI) is understood any information related to a person or user. Identity-related information IRI comprises names, addresses, group memberships, authorization credentials, demographic data, personal preferences, calendar entries, medical and financial information, and everything else that may be stored digitally about a person or under a user name. The requesting entity may desire it for access control, authorization, personalization, authentication, login, commercial, medical, or governmental issues, or any other application operating on identity-related information IRI. Another expression for this term could be credential, i.e. any certified information about a user or a person.

An authentication reference part is a uniformly chosen random, pseudorandom or otherwise hard to guess element. Authentication reference and authentication reference parts respectively are often called artifacts.

For the authentication of the user to the identity provider various methods can be used, e.g. a user name with a password, a personal identification number or a transaction number (TAN) or two-factor authentication methods such as smart cards, hardware tokens or e-mail messages.

The client application can be any software or hardware tool or device which is provided for communication with the requesting entity and the identity provider.

The method can further comprise a result step for communicating a result from the requesting entity to the client application by means of the first communication protocol.

The result page presents to the user the information which he requested from the requesting entity. The communication of the result page is often performed via a secure channel as the result page may comprise confidential or private information of the user.

After having received the result page, the user may often continue to use the client application via an insecure channel, e.g. by means of using an insecure browser protocol, e.g. the hyper text transfer protocol (HTTP). Hence an adversary might quite easily observe this further activity of the user. Because of the referrer function of the first communication protocol, the next communication message which the client application sends to the requesting entity or another entity might still comprise the second authenticity reference part in the referrer element. Hence an adversary might get this second authenticity reference part, but not the first authenticity reference part which is not available in this communication message anymore (provided the referrer function stores only information about one previous communication step). Hence, if an adversary only gets this second authenticity reference part, he cannot misuse it as it is worthless without the first authenticity reference part.

The first communication protocol is according to one embodiment of the invention a browser protocol, in particular a hyper text transfer protocol (HTTP). This enables a simple and widespread application of the embodiments of the invention. The user needs no additional software to execute the embodiments of the invention. Nevertheless the security of the method is ensured.

Browser protocols comprise often a referrer function. The messages according to the HTTP-protocol comprise in a first section the Uniform Resource Location (URL). The URL comprises a query-field which can be used in one step for the communication of the first authenticity reference part and in another step for the communication of the second authenticity reference part. In addition the messages of the HTTP-protocol comprise a second layer with one or more headers. The header comprises the referrer element, i.e. the URL of the last communication step and hence in the query field of the last URL the last authenticity reference part.

According to a further embodiment of the invention the first authenticity reference communication step and/or the second authenticity reference communication step and/or the result step are performed via a secure channel, in particular a secure channel with server authentication. The secure channel can preferably be implemented by means of the protocols Secure Sockets Layer (SSL), Transport Layer Security (TLS), or Simple Object Access Protocol (SOAP)-extensions such as Web Service (WS)-security.

This ensures that an adversary might not get the first and the second authenticity reference part during the first and/or the second authenticity reference communication step and/or not the information of the result page.

According to a further embodiment of the invention the second authenticity reference communication step is a redirecting step of redirecting the identity provider via the client application to the requesting entity. Such a redirecting step initiated by a redirecting command is a common element of browser protocols. This ensures that the invention can easily be implemented in various communication systems.

Preferably the redirecting step comprises a first and a second redirecting sub-step, wherein the identity provider sends in the first redirecting sub-step a redirecting command with a redirecting address to the client application, wherein the redirecting address comprises the second authenticity reference part, and wherein the client application sends in the second redirecting sub-step a get-request to the requesting entity comprising the redirecting address with the second authenticity reference part and in the referrer element the first authenticity reference part.

This means that the first authenticity reference part is only transmitted in the second-redirecting sub-step between the client application and the requesting entity, but not in the first redirecting sub-step. This enhances the security as both authenticity reference parts are only transmitted in one sub-step, but not in both and hence an adversary might get both authenticity reference parts only in the second sub-step.

According to a further embodiment of the invention the request step and the response step use a second communication protocol, in particular the Security Assertion Markup Language (SAML). But also other standards which use authenticity references (also called artifacts) for federated identity management can advantageously be used as second communication protocol. The related standards of the Liberty Alliance Project or the Web Service Federation are further preferred examples.

According to a further embodiment of the invention the request step and the response step are performed via a secure channel with mutual authentication. The secure channel can preferably be implemented by means of the protocols Secure Sockets Layer (SSL) or Transport Layer Security (TLS) with client and server certificates, or by means of Simple Object Access Protocol (SOAP)-extensions, such as WS-security.

This further improves the security and ensures that the first and the second authenticity reference part or the secure function of the first and the second authenticity reference parts do not flow to an adversary.

According to a further embodiment of the invention the secure function is an exclusive—or (XOR)—function, a pseudorandom function, a hash function, an encryption function or a secret sharing function.

All these functions have to ensure that it is impossible or at least nearly impossible for an adversary to reconstruct the result of these functions, which are calculated from the first and the second authenticity reference part, from only one of the authenticity reference parts.

According to a further embodiment of the invention the first authenticity reference communication step comprises a sub-step in which the identity provider sends the first authenticity reference part to the client application and a subsequent sub-step in which the client application sends an authentication and the first authenticity reference part to the identity provider.

In this embodiment the first authenticity reference part is generated before the user has authenticated himself to the identity provider. The identity provider sends in the first substep the first authenticity reference part to the client application. The message transmitted in this first authenticity reference communication step may additionally comprise an authentication form or an authentication command asking the user to enter a password or another authorization means. Then in a further sub-step the client application sends back the password or the other authorization means, e.g. by means of a submit- or a get request. The submit- or get request comprises as address a URL of the identity provider. In addition the communication message of this further sub-step comprises the first authenticity reference part, e.g. in a query field of the URL of the get or the submit request. As a result the current URL of the first communication protocol comprises the first authenticity reference part. This means that in the second authenticity reference communication step the first authenticity reference part will be transmitted in the referrer element, while the second authenticity reference part can be transmitted in the query field of the URL in the first layer.

It should be noted that the steps of the different aspects of the invention can be performed in different orders. Furthermore, the steps may also be combined, i.e. that e.g. two steps are performed together, e.g. in one communication message. As an example, the authentication of the user to the identity provider can be done in combination with the first authenticity reference part generation step and/or the first authenticity reference communication step. As another example the first and the second authenticity reference part generation steps can be performed simultaneously together in one step.

Another aspect of the invention relates to a method for receiving an identity-related information (IRI) from an identity provider possessing the identity related information, wherein a first communication protocol is provided for the communication with a user of a client application and with the identity provider, wherein the first communication protocol comprises a referrer function according to which a communication message may comprise a referrer element with information about at least one previous communication step, the method comprising:

receiving from the identity provider by means of the first communication protocol a second authenticity reference part and in the referrer element a first authenticity reference part, sending the first and the second authenticity reference part or a secure function of the first and the second authenticity reference part to the identity provider, receiving from the identity provider the identity related information (IRI).

In accordance with another aspect of the present invention there is presented a method for providing an identity-related information to a requesting entity, wherein a first communication protocol is provided for the communication with a user of a client application and with the requesting entity requesting the identity-related information, wherein the first communication protocol comprises a referrer function according to which a communication message may comprise a referrer element with information about at least one previous communication step, the method comprising:

generating a first authenticity reference part, communicating the first authenticity reference part to the client application, generating a second authenticity reference part, communicating by means of the first communication protocol the second authenticity reference part and in the referrer element the first authenticity reference part to the requesting entity, receiving from the requesting entity the first and the second authenticity reference part or a secure function of the first and the second authenticity reference part, sending a response with the identity related information to the requesting entity.

Another aspect of the invention relates to a computer program comprising instructions for carrying out the steps of the method according to any one of claims 1 to 12 when said computer program is executed on a computer system.

Another aspect of the invention relates to a requesting entity for receiving an identity-related information (IRI) from an identity provider possessing the identity related information, wherein the requesting entity is adapted to communicate with a user of a client application by means of a first communication protocol, wherein the first communication protocol comprises a referrer function according to which a communication message may comprise a referrer element with information about at least one previous communication step, wherein the requesting entity is adapted to perform the following steps:

receiving from the identity provider by means of the first communication protocol a second authenticity reference part and in the referrer element a first authenticity reference part, sending the first and the second authenticity reference part or a secure function of the first and the second authenticity reference part to the identity provider, receiving from the identity provider the identity related information.

Another aspect of the present invention relates to an identity provider for providing an identity-related information (IRI) to a requesting entity, wherein the identity provider is adapted to communicate with a user of a client application by means of a first communication protocol, wherein the first communication protocol comprises a referrer function according to which a communication message may comprise a referrer element with information about at least one previous communication step, wherein the identity provider is adapted to perform the following steps:

generating a first authenticity reference part, communicating the first authenticity reference part to the client application, generating a second authenticity reference part, communicating by means of the first communication protocol the second authenticity reference part and in the referrer element the first authenticity reference part to the requesting entity, receiving from the requesting entity the first and the second authenticity reference part or a secure function of the first and the second authenticity reference part, sending a response with the identity related information to the requesting entity.

Another aspect of the present invention relates to a system for providing an identity-related information to a requesting entity by means of a identity provider, wherein a client application is provided for the communication of a user with the requesting entity and with the identity provider, wherein the client application uses a first communication protocol, wherein the first communication protocol comprises a referrer function according to which a communication message may comprise a referrer element with information about at least one previous communication step, wherein the system is adapted to perform the following steps:

authenticating the user to the identity provider, a first authenticity reference generation step, comprising the generation of a first authenticity reference part by the identity provider, a first authenticity reference communication step between the client application and the identity provider comprising the communication of the first authenticity reference part a second authenticity reference part generation step, comprising the generation of a second authenticity reference part by the identity provider, a second authenticity reference communication step between the identity provider and the requesting entity by means of the first communication protocol comprising the communication of the second authenticity reference part and in the referrer element the communication of the first authenticity reference part, a request step wherein the requesting entity sends the first and the second authenticity reference part or a secure function of the first and the second authenticity reference part to the identity provider, a response step wherein the identity provider sends the identity related information (IRI) to the requesting entity.

Another aspect of the present invention relates to a method for providing an identity-related information to a requesting entity by means of an identity provider, wherein a client application is provided for the communication of a user with the requesting entity and with the identity provider, wherein the client application uses a first communication protocol, said method comprising:

checking whether the first communication protocol comprises a referrer element with information about at least one previous communication step, performing the following steps if the first communication protocol comprises a referrer function:

authenticating the user to the identity provider, a first authenticity reference part generation step, comprising the generation of a first authenticity reference part by the identity provider, a first authenticity reference communication step between the client application and the identity provider comprising the communication of the first authenticity reference part a second authenticity reference part generation step, comprising the generation of a second authenticity reference part by the identity provider, a second authenticity reference communication step between the identity provider and the requesting entity by means of the first communication protocol comprising the communication of the second authenticity reference part and in the referrer element the communication of the first authenticity reference part, a request step wherein the requesting entity sends the first and the second authenticity reference part or a secure function of the first and the second authenticity reference part to the identity provider, a response step wherein the identity provider sends the identity related information (IRI) to the requesting entity.

According to this aspect of the present invention there is provided an additional checking step which is preferably performed by the identity provider. In this checking step it is examined whether the communication messages which are sent by the client application to the identity provider and/or the requesting entity comprise a referrer element. If they do not comprise a referrer element, the communication of only one authenticity reference part from the identity provider to the requesting entity is sufficient. The checking step might be performed before or after the authentication of the user to the identity provider. The reason that the communication messages do not comprise a referrer element can be either that the first communication protocol do not comprise a referrer function at all or that the referrer function has been switched off and deactivated respectively.

This aspect of the invention is in particular useful for applications in which communication protocols with a referrer function as well as communication protocols without a referrer function are used or where the client can choose whether to set a referrer or not.

The various embodiments of the present invention allow a reliable, secure and efficient identity management that can, with full interoperability, accommodate to various requirements of participants, in particular the transfer of authentication and other identity-related information. The invention is applicable to systems where a user only has a browser software as well as to systems where he has more powerful software. In particular it allows the combination of simple browser protocol (e.g. HTTP) and a more sophisticated federated identity management protocol (e.g. SAML). The simple browser protocol may be used for the communication of the client application with the identity provider and the requesting entity, while the federated identity management protocol may be used for the communication between the identity provider and the requesting entity.

In other words, the invention enables end users of web-based services, e.g. end user of e-business, to perform single sign-on (SSO) operations, distributed transactions or other authorization services. The presented embodiments and aspects of the invention can support a zero footprint version, i.e., there is no other software needed, not even active content like Javascript, Java, or ActiveX (Javascript and Java are trademarks of Sun Microsystems, Inc. ActiveX is a trademark of Microsoft Corporation).

DESCRIPTION OF THE DRAWINGS

Preferred embodiments of the invention are described in detail below, by way of example only, with reference to the following schematic drawings.

Glossary

The following are informal definitions to aid in the understanding of the description.

User or Person: An entity whose identity is managed. If the person acts it becomes the user. Typically the person or user is an individual, but at least small businesses will often interact with other businesses just like individuals, e.g., in travel booking and information gathering.

Requesting entity: An entity, e.g. an organization represented by a server, who wants to know a name or attributes of a person. Initial organizations will mainly be Internet shops because of the low assurance of any easily deployable registration system. In the long run, organizations include all a person's communication partners such as banks, doctors, colleagues, and family. Colleagues and family as "organizations" are particularly relevant if one wants to include contact or location information in identity management, e.g., instant messaging and calendering.

Identity provider: An entity that stores identity-related information for a person. This might be a bank, a certificate authority (CA), an Internet Service provider etc.

The term computer includes devices like PCs but also digital assistants and mobile phones with browsing facilities.

DETAILED DESCRIPTION

Figure 1:
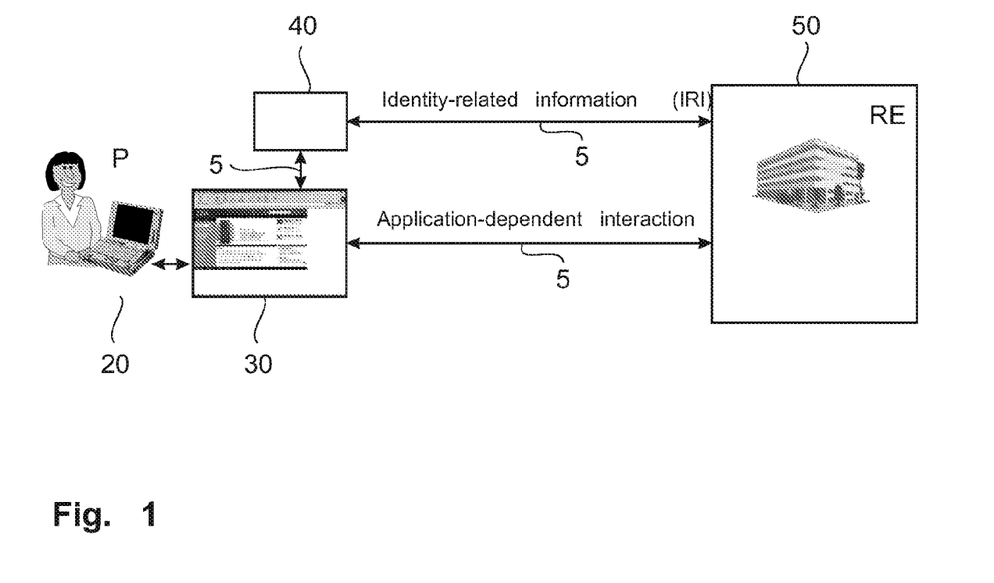
FIG. 1 shows a schematic illustration of a system according to the present invention.

With reference to FIG. 1, the general layout of a communication environment is described in which the invention can be used. In the figures, same reference signs are used to denote the same or like parts. FIG. 1 shows a person P, who acts as a user 20. The user 20 executes a client application 30, e.g. a web browser, on his computer. The client application 30 is connected for application-dependent interactions to a requesting entity 50, e.g. a server of a company or bank which provides services. The client application 30 and the requesting entity 50 are connected via communication lines 5 as they are known in the art. The communication lines 5 are usually provided through a network, e.g. the Internet. The client application 30 is further connected to an identity provider 40, whereby the identity provider 40 can be local, i.e. at the computer of the user 20, or remote, i.e. on an external server or the like. The identity provider 40 can e.g. be a bank or another professional organization which offers identity management services. The identity provider 40 is also connectable to the requesting entity 50 for the transmission of identity-related information IRI. Under the term identity-related information IRI is understood any information related to a person or user. Identity-related information IRI comprises names, addresses, group memberships, authorization credentials, demographic data, personal preferences, calendar entries, medical and financial information, and everything else that may be stored digitally about a person or under a user name. The requesting entity may desire it for access control, authorization, personalization, authentication, login, commercial, medical, or governmental issues, or any other application operating on identity-related information IRI. The scenario in FIG. 1 is shown to facilitate the description of the following flows for providing the identity-related information IRI to the requesting entity 50.

The client application 30 communicates with the identity provider 40 and the requesting entity 50 preferably by means of a first communication protocol. This first communication protocol is preferably a browser-based protocol, e.g. a hyper text transfer protocol (HTTP). The first communication protocol comprises a referrer function according to which a communication step comprises a referrer element with information about at least one previous communication step. If the first communication protocol is e.g. a browser based protocol like HTTP, the communication messages which the client application 30 sends to communication partners comprise in the referrer element the previous visited Uniform Resource Location (URL) of the client application. According to HTTP the referrer element is allocated in the header of a communication message.

It is noted that the original RFC 2068 protocol (http://www.ietf.org/rfc/rfc2068.tat) and the HTTP1.1 RFC2616 comprised by mistake the wrong spelling "referer" and made this spelling the spelling for the http-standards. Nevertheless in this application the correct English spelling referrer will be used, except for the direct citing of HTTP-command language.

The identity provider 40 and the requesting entity 50 can communicate directly for exchange of the IRI by means of a second communication protocol, e.g. by means of the Security Assertion Markup Language (SAML) or other Federated Identity Management protocol like the Liberty Alliance Project and the WS-Federation.

Figure 2:
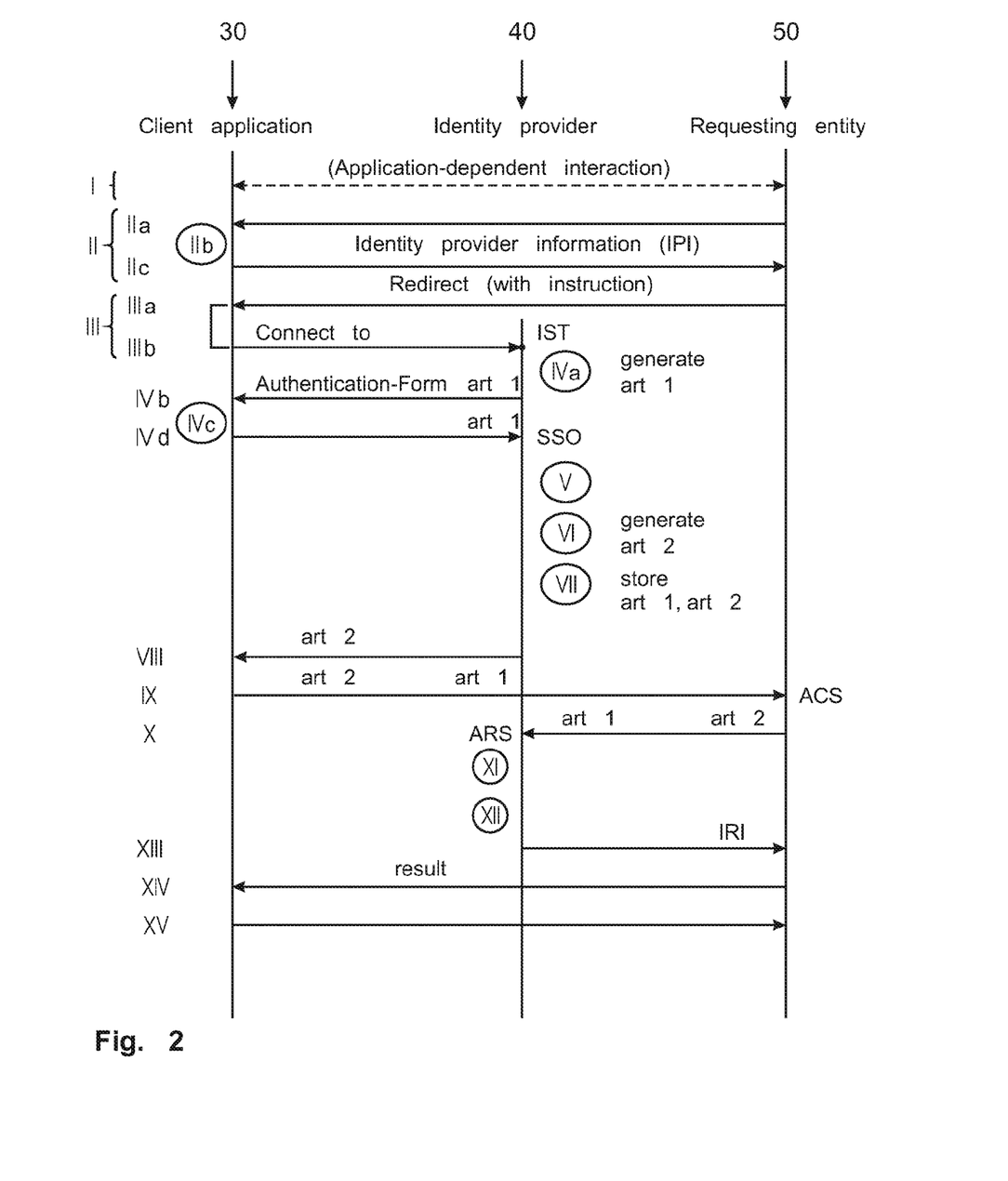
FIG. 2 shows a schematic illustration of the message flow of a first embodiment according to the present invention.

FIG. 2 shows a schematic illustration of a message flow of a first embodiment. Therein, the message flow between the client application 30, the identity provider 40, and the requesting entity 50 is depicted with labeled arrows to which respective Roman numbers are assigned. Further steps or sub-steps are indicated by Roman numbers in a circle. The flow is understood as being performed sequentially from top to bottom as indicated by the increasing Roman numbers. However, it should be noted that there may be multiple instances of this protocol run in parallel without specified ordering.

In step I application-dependent interactions are performed between the client application 30 and the requesting entity 50. In this step I the user might visit public websites of the requesting entity with no access restrictions. If the user wants to access a website with restricted access or perform an action which needs authentication (e.g. perform a buy-transaction or a transfer of money) the requesting entity 50 initiates an identity provider request step II. In a sub-step IIa the requesting entity 50 requests from the client application 30 a identity provider information (IPI) that corresponds to the identity provider 40 that possesses the identity-related information IRI. The identity provider information (IPI) is sent to the requesting entity 50 in sub-step IIc. Optionally, sub-step IIb allows the client application 30 to derive the identity provider information IPI in different ways, for example, by asking the user 20. Optionally, the requesting entity 50 uses per default a specific identity provider 40. In this case the identity provider request step II can be omitted. It follows a redirecting step III with a redirect instruction (sub-step IIIa) wherein after all the client application 30 is connected to a inter-site transfer (IST)-URL of the identity provider 40 (sub-step IIIb).

In a first authenticity reference part generation step IVa the identity provider 40 generates a first authenticity reference part art1 for the user. Authenticity references are often called artifacts. This first authenticity reference part art1 is a uniformly chosen random, pseudorandom or otherwise hard to guess element. In step IVb the identity provider 40 sends a message to the client application 30 which comprises a authentication form asking the user to authenticate himself, e.g. by means of a user name and password or a personal identification number (PIN). In addition, this message comprises a Single Sign On (SSO)-URL-address of the identity provider 40 at which the client application 30 should submit the completed authorization form. This SSO-URL-address comprises in a query field the first authenticity reference part art1. In step IVc the user submits his user name and password to the client application 30. e.g. by means of a keyboard input. In step IVd the client application 30 sends the completed authorization form back to the identity provider 40 at the specified SSO-URL address which comprises in a query field the first authenticity reference part art1. Step IVb and step IVd establish a first authenticity reference communication step. This first authenticity reference communication step delivers the first authenticity reference part art1 to the current URL of the first communication protocol. In other words, in the first authenticity reference communication step the client application 30 (the browser) contacts the identity provider 40 and the identity provider 40 communicates the first authenticity reference part art1 to the client application 30. In this exemplary embodiment of the invention the first authenticity reference communication step is combined with the authentication of the user. This enhances the efficiency of the method and saves additional steps. However, the authentication and the first authenticity reference communication step might also be performed separately.

In step V the identity provider 40 checks if the delivered authentication information, e.g. the password or PIN is correct. If this is the case, the user has successfully authenticated himself to the identity provider 40. In a second authenticity reference generation step VI the identity provider 40 generates a second authenticity reference part art2 for the successfully authorized user, also referred to as artifact 2. The second authenticity reference part art2 is a uniformly chosen, random, pseudorandom or otherwise hard to guess element as well that is independent from the first authenticity reference part art1.

In step VII the service provider 40 stores the first and the second authenticity reference parts art1 and art2 and the relationship between the first and the second authenticity reference parts art 1 and art 2, i.e. that they belong together as a pair.

In a first redirecting sub-step VIII the identity provider 40 sends a redirect command to the client application 30. The redirect command comprises as redirecting address an Assertion Consumer Service (ACS)-URL of the requesting entity 50 and this ACS-URL comprises in a query field the second authenticity reference part art2. The ACS-URL is an address of the requesting entity 50 which is provided for federated identity management, e.g. according to the SAML-standard. In a second redirecting sub-step step IX the client application 30 sends a get request to the requesting entity 50 which comprises the requested ACS-URL of the requesting entity and this requested ACS-URL comprises the second authenticity reference part art2. The communication message sent in step IX comprises in addition the last URL (SSO) of the browser in the referrer element. Hence as the last URL comprises in a query field the first authenticity reference part art1, the first and the second authenticity reference parts art1 and art2 are transmitted in step IX. The first redirecting sub-step VIII and the second redirecting sub-step IX establish in general a second authenticity reference communication step and in this particular example a redirecting step.

In a request step X the requesting entity sends the first and the second authenticity reference parts art1 and art 2 to an assertion response service address ARS of the identity provider 40. The assertion response service can e.g. be an assertion response service according to the SAML-standard.

In step XI the identity provider 40 checks if the first and the second authenticity reference part art1 and art2 are valid, i.e. if they correspond to a pair of authenticity reference parts which the identity provider 40 has issued before and which are not invalidated or lapsed.

In step XII the identity provider 40 removes or deletes the first and the second authenticity reference part art1 and art2 which have been sent before from the requesting entity from its database. This ensures that no further use of these authenticity reference parts for any authentication purposes is possible.

If the first and the second authenticity reference parts art1 and art2 transmitted in step X were valid, then the identity provider 40 sends in a response step XIII a response with the identity related information IRI to the requesting entity 50. Otherwise the identity provider 40 sends in the response step XIII an error message to the requesting entity 50 which indicates that the received first and second authenticity reference parts art1 and art2 were invalid.

In step XIV the requesting entity 50 sends a result with a result page to the client application 30 which comprises a result to the request of the user 20 issued in step I. This might be either the requested result page or an error page. As the result page often comprises confidential information, step XIV is preferably performed via a secure channel.

After having received the result page, the user may often continue with a further step XV. In this further step XV the user sends a further request to the requesting entity 50 or to another server. For this further request the user might often use an insecure browser protocol. i.e., a browser protocol that is not performed via a secure channel. As an example the further request might be send to the requesting entity 50 be means of the hyper text transfer protocol (HTTP). Hence an adversary might quite easily observe this further request and might get the information of the further request. The information which is transferred in this further request comprises the address of the new URL which the user wants to get, but also in the referrer element the information of the former URL. The former URL (in this case the ACS-URL) comprises the second authenticity reference part art2 and hence an adversary might quite easily get this second authenticity reference part art2. However, the further request does not comprise any information about the first authenticity reference part art1 anymore, as this has been already deleted from the referrer element. Hence, if an adversary only gets this second authenticity reference part art2, he cannot misuse it as it is worthless without the first authenticity reference part art1

To further enhance the security the first authenticity reference communication step IVb, IVd., the second authenticity reference communication step VIII, IX as well as the request step X and the response step XIII should be performed via a secure channel. The secure channel can preferably be implemented by means of the protocols Secure Sockets Layer (SSL), Transport Layer Security (TLS), or Simple Object Access Protocol (SOAP)-extensions such as Web Service (WS)-security. The request step X and the response step XIII can preferably be performed with mutual authentication, while the first authenticity reference communication step IVb, IVd and the second authenticity reference communication step VIII, IX can preferably be performed with server authentication.

Figure 3:
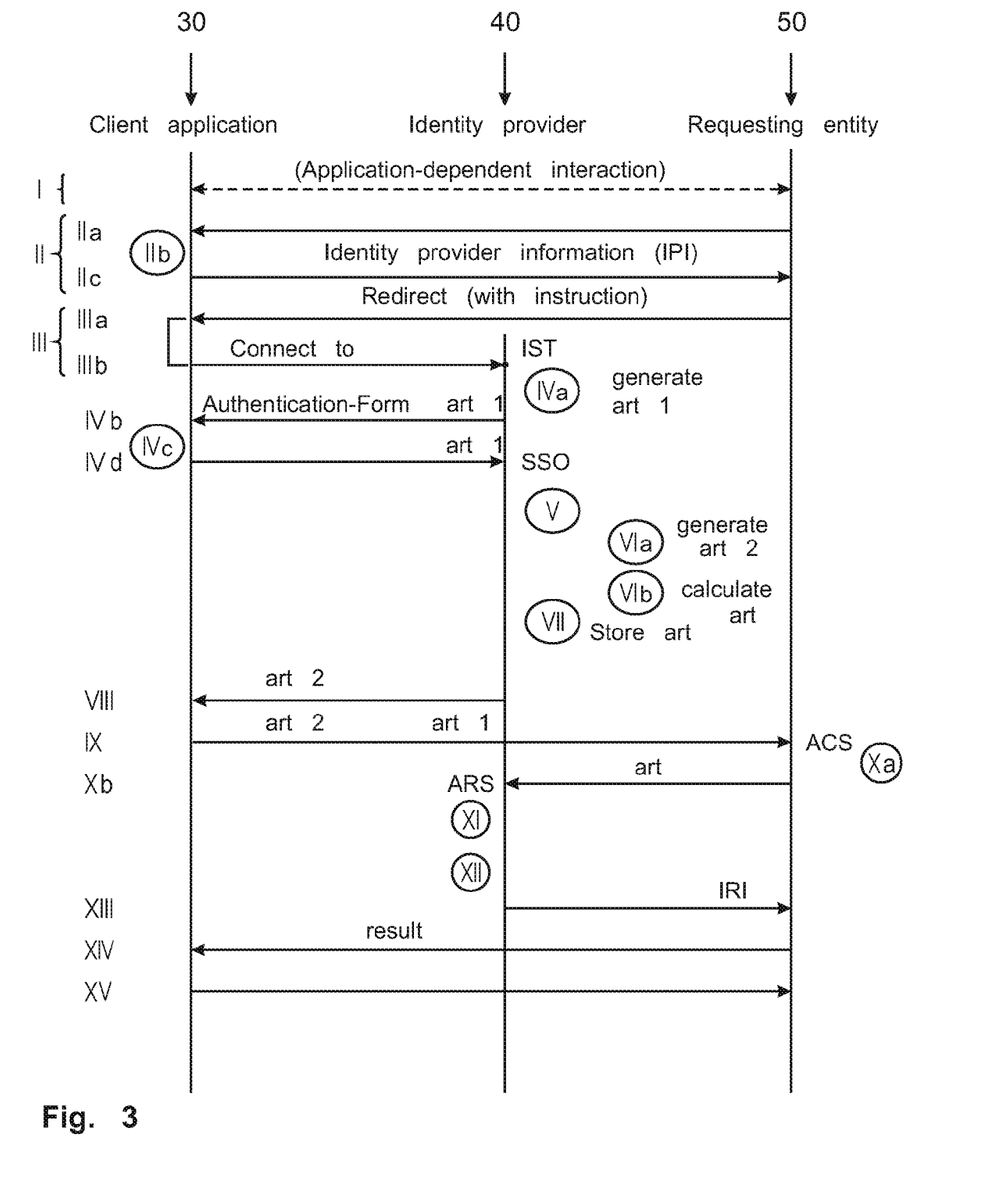
FIG. 3 shows a schematic illustration of the message flow of a second embodiment according to the present invention.

FIG. 3 shows a schematic illustration of the message flow of a second embodiment of the invention. Steps I to V are the same as described with respect to FIG. 2 and are therefore not explained again. The second authenticity reference generation step VI is in this embodiment split up in two sub-steps. In a first sub-step VIa the second authenticity reference part art2 is generated. The second authenticity reference part art2 is a random, pseudorandom or otherwise hard to guess element. In a second sub-step VIb a main authenticity reference part art is calculated and determined respectively. The main authenticity reference part art is an artifact which is calculated and determined respectively by a secure function out of the first authenticity reference part art1 and the second authenticity reference part art2.

The secure function is preferably an exclusive-or function (XOR). Then the main authenticity reference part art is determined as follows:

Main artifact art=art1 XOR art2.

In step VII the identity provider 40 stores the main authenticity reference art in its database. In case of a real random choice of the first authenticity reference part art1 and the second authenticity reference part art2 the first authenticity reference part art1 and the second authenticity reference part art2 are information theoretically independent of the main authenticity reference part art.

Steps VIII and IX are the same as described with respect to FIG. 2 and are therefore not explained again.

In this embodiment the request step X comprises two sub-steps Xa and Xb. The requesting entity 50 calculates in the sub-step Xa the main authenticity reference art from the received first and second authenticity reference parts art1 and art2 by means of the secure function, e.g. by the XOR-function. This means that according to this embodiment also the requesting entity 50 must know the secure function.

In sub-step Xb the requesting entity 50 sends the main authenticity reference art to the identity provider 40.

In step XI the identity provider 40 checks if the received main authenticity reference art is valid, i.e. that it corresponds to a stored main authenticity reference which the identity provider has issued before and which has not been deleted or has lapsed or is invalid for other reasons.

In step XII the identity provider 40 removes or deletes the stored main authenticity reference art which has been sent before from the requesting entity 50. This ensures that no further use of this main authenticity reference for any authentication purposes is possible.

If the main authenticity reference transmitted in step XI was valid, then the identity provider 40 sends in a response step XIII a response with the identity related information IRI to the requesting entity 50. Otherwise the identity provider 40 sends in the response step XIII an error message to the requesting entity which indicates that the sent main authenticity reference was invalid.

Steps XIV and XV are the same as described with respect to FIG. 2 and are therefore not explained again.

In the embodiment according to FIG. 3 the identity provider 40 and the requesting entity 50 must know the secure function. On the other hand the database of the identity provider 40 has only to store the main authenticity reference art and not both authenticity reference parts art1 and art2. In addition in the request step only the main authenticity reference art has to be transmitted.

It should be noted that also other solutions are possible, e.g. that the identity provider 40 only stores the main artifact art, the requesting entity 40 is not aware of the secure function and transmits in the request step the first and the second authenticity reference parts art1 and art2 and the identity provider 40 calculates from the received first and second authenticity reference parts art1 and art2 the main authenticity reference art and checks whether it has stored a matching and valid main authenticity reference art.

FIGS. 4*a* to 4*f* show exemplary embodiments of communication messages which may be transmitted in some of the steps of the methods shown in FIG. 2 and/or FIG. 3. The example messages shown in FIG. 4*a* to FIG. 4*f* are based on the hyper transfer transport protocol version 1.1 (HTTP 1.1)

Figure 4A:
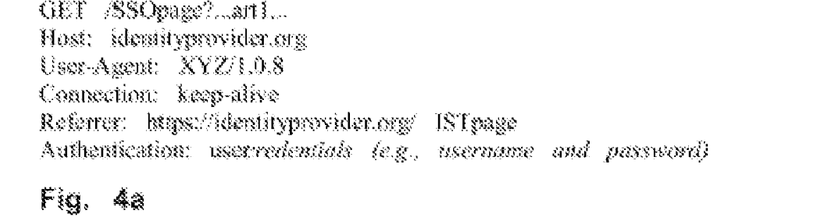
FIGS. 4a to 4f show schematic illustrations of exemplary embodiments of communication messages.

FIG. 4*a* shows an exemplary embodiment of a communication message which may be sent by the client application 30 to the identity provider 40 in step IVd. In this embodiment HTTP-authentication is used. The client application 30 sends a get request to the identity provider 40 comprising as address a single sign on page SSO page and in a query field the first authenticity reference part art1. The name of the server of the identity provider (of the host) is identity provider.org and the name of the browser of the client application 30 is XYZ.1.0.8. The referrer element of this communication message comprises the former destination URL of the client application 30, in this example the inter-site transfer IST-page. This referrer element is generally allocated in a header of the communication message. In a further field of this header the client application transmits user credentials, e.g. a username and a password to the identity provider 40.

Figure 4B:
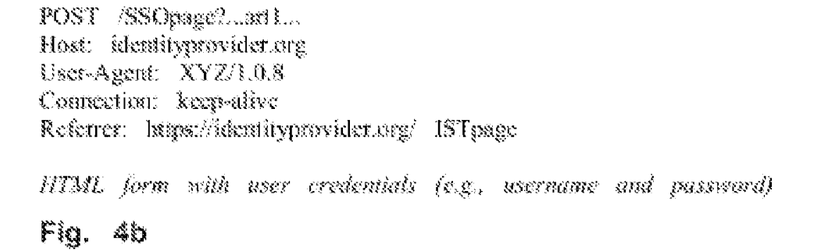

FIG. 4b shows another exemplary embodiment of a communication message which may be sent by the client application 30 to the identity provider 40 in step IVd. In this embodiment HTML-form based authentication is used. Accordingly instead of a get-command a post-command is sent and the HTML-form comprises the user credentials.

Figure 4C:
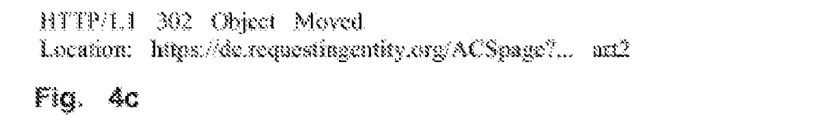

FIG. 4c shows an exemplary embodiment of a communication message which may be sent by the identity provider 40 to the client application 30 in step VIII. It is a redirect command of the identity provider 40 asking the client application 30 to go to an Assertion Consumer Service page ACS page of the server de.requestingentity.org at the requesting entity 50. The query field of this message comprises the second authenticity reference part art2.

Figure 4D:
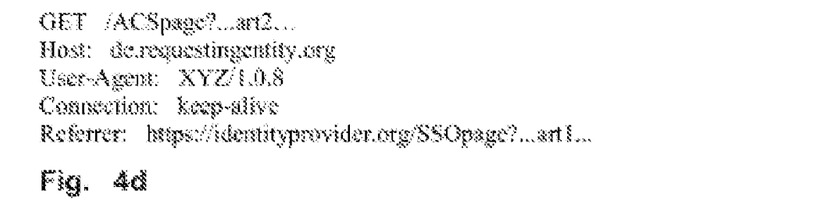

FIG. 4d shows an exemplary embodiment of a communication message which may be sent by the client application 30 to the requesting entity 50 in step IX. The client application 30 sends a get request to the requesting entity 50 requesting to get the ACSpage. This message comprises in the query field the second authenticity reference part art2. The name of the server of the requesting entity 50 (of the host) is de.requestingentity.org. The referrer element of this communication message comprises the former destination URL of the client application 30 https://identityprovider.org/SSOpa e? . . . art1. Hence the query field of referrer element comprises the first authenticity reference part art1. Hence this communication message comprises the first authenticity reference part art1 as well as the second authenticity reference part art2.

Figure 4E:
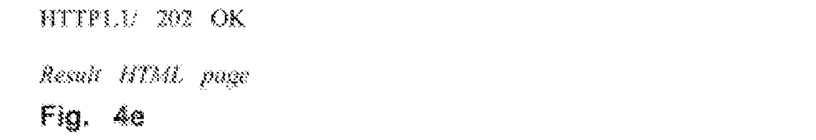

FIG. 4e shows an exemplary embodiment of a communication message transmitted in step XIV from the requesting entity 50 to the client application 30. It comprises as a result a HTML-page.

Figure 4F:
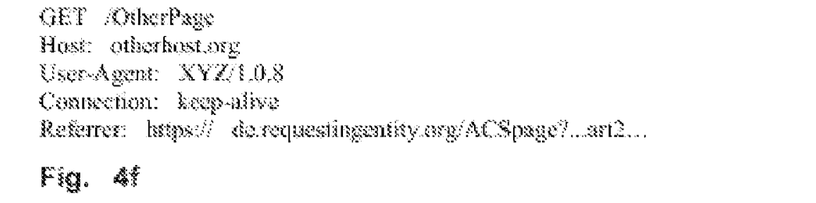

FIG. 4f shows an exemplary embodiment of a communication message which may be sent by the client application 30 to the requesting entity 50 in step XV. The client application 30 sends a get request to another server named otherhost.org comprising a destination page named otherpage. The referrer element of this communication message comprises the former destination URL of the client application 30. In this example it is the URL https://de.requestingentity.org/ACSpage? . . . art2 . . . . The query field of this URL comprises still the second authenticity reference part art2, but the communication message does not comprise the first authenticity reference part art1 anymore. Hence if an adversary gets access to this communication message shown in FIG. 4f it is worthless for him.

Figure 5:
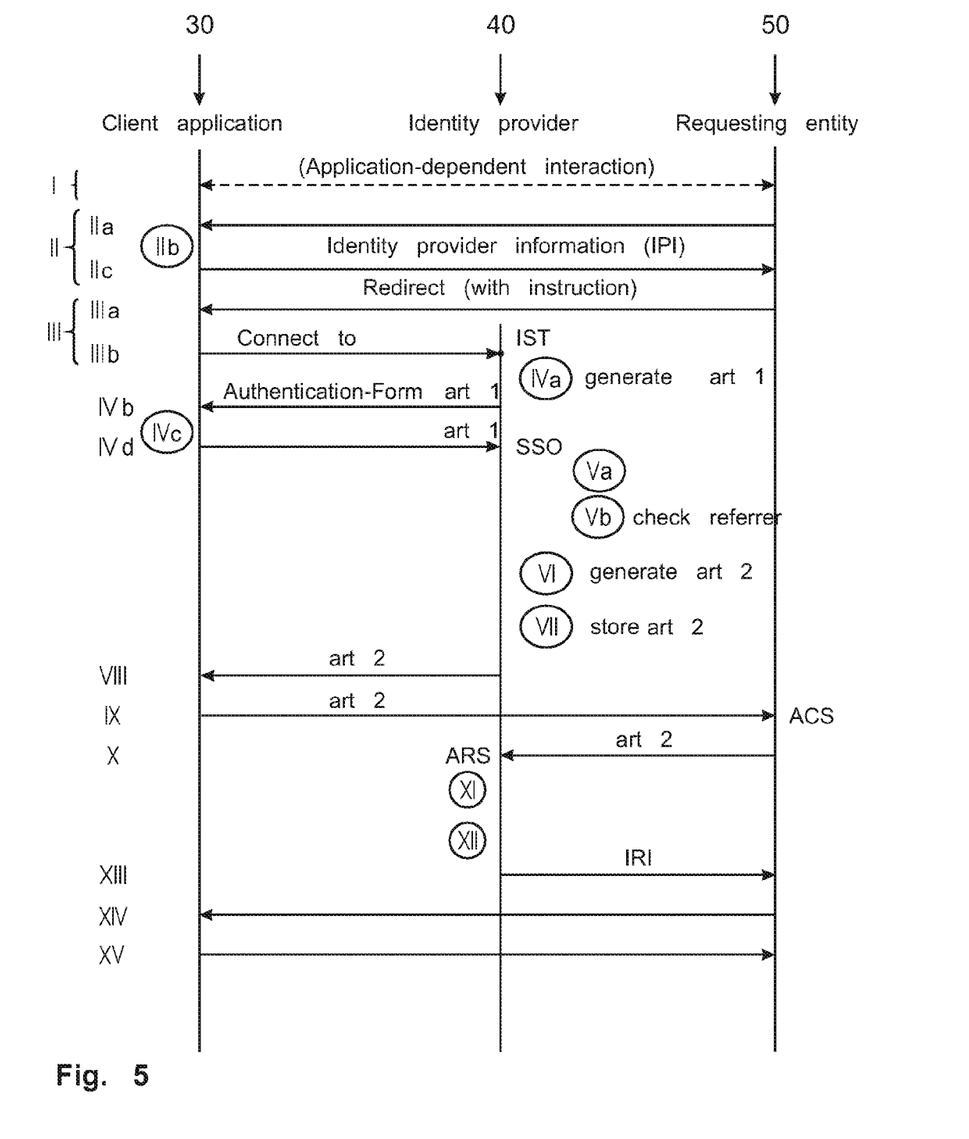
FIG. 5 shows a schematic illustration of the message flow of a third embodiment of the invention

FIG. 5 shows a schematic illustration of the message flow of a third embodiment of the invention. Steps I to IV are the same as described with respect to FIG. 2 and are therefore not explained again. In a step Va the identity provider 40 checks if the delivered authentication information, e.g. the password or PIN is correct. If this is the case, the user has successfully authenticated himself to the identity provider 40. In a further step Vb the identity provider 40 checks if the client application comprises and uses respectively a referrer function. If this is the case, the method may continue with the steps as described in FIG. 2 or FIG. 3. If the identity provider 40 recognizes that the client application 30 does not use a referrer function, the following steps are performed. In a second authenticity reference generation step VI the identity provider 40 generates a second authenticity reference part art2 for the successfully authorized user. As an alternative the first authenticity reference part art1 might be used gain. The second authenticity reference part art2 is a random, pseudorandom or otherwise hard to guess element as well.

In step VII the service provider 40 stores the second authenticity reference part art2. In a first redirecting sub-step VIII the identity provider 40 sends a redirect command to the client application 30. The redirect command comprises an Assertion Consumer Service (ACS)-URL of the requesting entity 50 and this ACS-URL comprises in a query field the second authenticity reference part art2. In a second redirecting sub-step step IX the client application 30 sends a get request to the requesting entity 50 which comprises the requested ACS-URL of the requesting entity and this requested ACS-URL comprises the second authenticity reference part. In a request step X the requesting entity 50 sends the second authenticity reference part art2 to an assertion response service address ARS of the identity provider 40. In step XI the identity provider 40 checks if the second authenticity reference part art2 is valid. In step XII the identity provider 40 removes or deletes the second authenticity reference part art2.

If the second authenticity reference part art2 transmitted in step X was valid, then the identity provider 40 sends in a response step XIII a response with the identity related information IRI to the requesting entity 50. Otherwise the identity provider 40 sends in the response step XIII an error message to the requesting entity 50 which indicates that the received second authenticity reference parts art2 was invalid.

Steps XIV and XV are again the same as described with respect to FIG. 2 and FIG. 3. This embodiment is in particular suited for applications where the client applications 30 sometimes use communication protocols with a referrer function and sometimes use communication protocols without a referrer function or where the referrer function of the client application might be switched off by the user.

Figure 6:
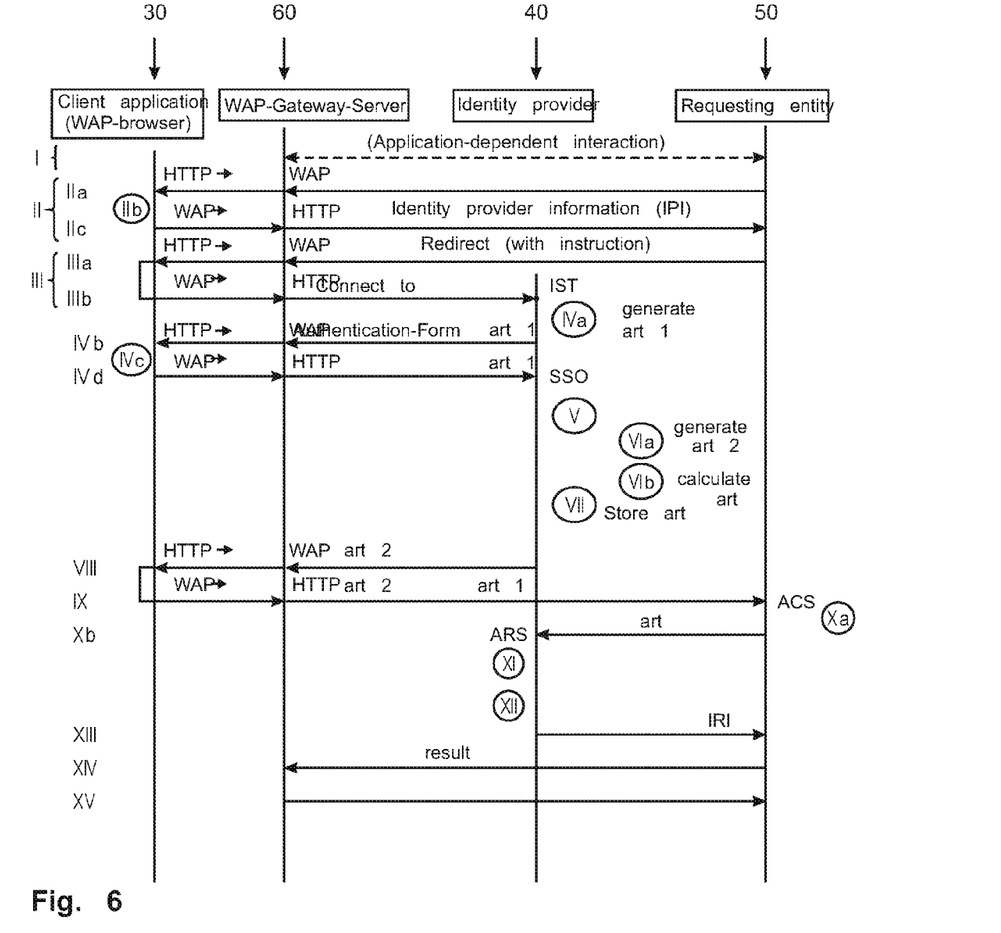
FIG. 6 shows a schematic illustration of the message flow of a fourth embodiment according to the present invention, The drawings are provided for illustrative purpose only and do not necessarily represent practical examples of the present invention to scale.

FIG. 6 shows a schematic illustration of the message flow of a fourth embodiment of the invention. Steps I to XV are to a large extent similar to the steps as described with respect to FIG. 3 and are therefore not explained in total again. According to this embodiment the client application 30 is a Wireless Application Protocol (WAP)-browser of a mobile device, e.g. of a cell phone. WAP was designed to provide services equivalent to a Web-browser with some mobile-specific additions, being specifically designed to address the limitations of very small portable devices. According to this embodiment a WAP-Gateway-server 60 is provided as an interface between the WAP-format and the HTTP-format. The WAP-gateway server 60 translates or transforms respectively messages in the HTTP-format that arrive from the identity provider 40 or the requesting entity 50 into messages in the WAP-format. On the other hand, the WAP-gateway server 60 translates messages in the WAP-format from the client application 30 into messages in the HTTP-format that can be forwarded to the identity provider 40 or the requesting entity 50.

This translation is performed in the following steps. In the sub-step IIa the requesting entity 50 requests from the client application 30 the identity provider information (IPI). The WAP-gateway server 60 translates this HTTP-request into a WAP-request. The client application 30. i.e., the WAP-browser, then sends in sub-step IIc the identity provider information IPI to the WAP-gateway 60 which translates the WAP-message into the HTTP-format and forwards it to the requesting entity 50. In a corresponding way such a translation from HTTP-format into WAP-format and vice versa is performed in the redirecting step III, in the first authenticity reference communication step IVb, IVd and in the second authenticity reference communication step VIII, IX.

Apart from the above described embodiments the invention is applicable to various other areas. As a further example, the invention can be used for the authentication of audio and/or video transmission via the Internet. In this example, the requesting entity 50 could be a content provider of audio and/or video data and the client application 30 would be a content player. The content player sends a request for getting a content stream to the content provider, the authentication is performed according to one of the above described methods, and as a response the content provider sends the content stream to the content player.

The present invention is applicable to various standards, in particular for the OASIS Security Assertion Markup Language, the Liberty Alliance Project and the WS-Federation.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A computer implemented method for providing identity-related information (IRI) to a requesting entity by means of an identity provider, wherein a client application is provided for the communication of a user with the requesting entity and with the identity provider, wherein the client application uses a first communication protocol, wherein the first communication protocol comprises a referrer function according to which a communication message comprises a referrer element with information about previous communication, said method comprising:

authenticating, by a computing device, the user to the identity provider;

a first authenticity reference part generation step, comprising the generation, by said computing device, of a first authenticity reference part by the identity provider;

a first authenticity reference communication step between the client application and the identity provider comprising the communication, by said computing device, of the first authenticity reference part;

a second authenticity reference part generation step, comprising the generation, by said computing device, of a second authenticity reference part by the identity provider based on verification of user delivered authentication information sent to the identity provider in response to said first authenticity reference part communicated to the client application;

a second authenticity reference communication step between the identity provider and the requesting entity, by means of the first communication protocol, comprising the communication, by said computing device, of the second authenticity reference part and in the referrer element the communication of the first authenticity reference part;

a request step wherein the requesting entity sends one of the first and the second authenticity reference part, and a secure function of the first and the second authenticity reference part to the identity provider;

a removing step wherein the identity provider deletes information regarding the first and second authenticity reference parts from an identity provider database; and a response step wherein the identity provider sends the identity related information (IRI) to the requesting entity, where the referrer element includes a former destination URL of the client application, where the first authenticity reference part is a uniformly chosen random, pseudorandom or otherwise hard to guess element, where the second authenticity reference part is a uniformly chosen random, pseudorandom or otherwise hard to guess element that is independent from the first authenticity reference part, where the first authenticity reference communication step delivers the first authenticity reference part to a current URL of the first communication protocol, and where the second authenticity reference communication step sends a redirect command to the client application and the client application sends a get request to the requesting entity.

2. The method according to claim 1, further comprising:
a result step for communicating a result from the requesting entity to the client application by means of the first communication protocol.

3. The method according to claim 1, wherein the first communication protocol is a hyper text transfer protocol (HTTP).

4. The method according to claim 2, wherein the first authenticity reference part communication step, the second authenticity reference part communication step, and the result step are performed via a secure channel with server authentication.

5. The method according to claim 1, wherein the second authenticity reference communication step is a redirecting step of redirecting, by said computing device, the identity provider via the client application to the requesting entity.

6. The method according to claim 5, wherein the redirecting further comprises:

a first and a second redirecting sub-step, wherein the identity provider sends in the first redirecting sub-step a redirecting command with a redirecting address to the client application, wherein the redirecting address comprises the second authenticity reference part, wherein the client application sends the second redirecting sub-step a get-request to the requesting entity comprising the redirecting address with the second authenticity reference part and in the referrer element the first authenticity reference part.

7. The method according to claim 1, wherein the request step and the response step use a second communication protocol including a Security Assertion Markup Language (SAML) communication protocol.

8. The method according to claim 1, wherein the request step and the response step are performed via a secure channel with mutual authentication.

9. The method according to claim 1, wherein the secure function comprises one of a XOR function, a pseudorandom function, a hash function, an encryption function, and a secret sharing function.

10. The method according to claim 1, wherein the first authenticity reference part communication step further comprises:
the identity provider sending the first authenticity reference part to the client application; and
the client application sending an authentication and the first authenticity reference part to the identity provider.

11. A computer implemented method for providing identity-related information (IRI) to a requesting entity by means of an identity provider, wherein a client application is provided for the communication of a user with the requesting entity and with the identity provider, wherein the client application uses a first communication protocol, wherein the first communication protocol comprises a referrer function according to which a communication message comprises a referrer element with information about previous communication, said method comprising:
receiving from the identity provider, by means of the first communication protocol, a second authenticity reference part, and in the referrer element, a first authenticity reference part;
sending one of the first and the second authenticity reference part, and a secure function of the first and the second authenticity reference part to the identity provider, wherein the second authenticity reference part is generated based on verification of user delivered authentication information sent to the identity provider in response to said first authenticity reference part communicated to the client application;
deleting information regarding the first and second authenticity reference parts from an identity provider database; and
receiving from the identity provider the identity related information (IRI),
where the referrer element includes a former destination URL of the client application,
where the first authenticity reference part is a uniformly chosen random, pseudorandom or otherwise hard to guess element,
where the second authenticity reference part is a uniformly chosen random, pseudorandom or otherwise hard to guess element that is independent from the first authenticity reference part.

12. A computer implemented method for providing identity-related information (IRI) to a requesting entity by means of an identity provider, wherein a client application is provided for the communication of a user with the requesting entity and with the identity provider, wherein the client application uses a first communication protocol, wherein the first communication protocol comprises a referrer function according to which a communication message comprises a referrer element with information about previous communication, said method comprising:
generating a first authenticity reference part;
communicating the first authenticity reference part to the client application;
generating a second authenticity reference part based on verification of user delivered authentication information sent to the identity provider in response to said first authenticity reference part communicated to the client application;
communicating, by means of the first communication protocol, the second authenticity reference part and in the referrer element the first authenticity reference part to the requesting entity;
receiving from the requesting entity one of the first and the second authenticity reference part, and a secure function of the first and the second authenticity reference part;
deleting information regarding the first and second authenticity reference parts from an identity provider database; and
sending a response with the identity related information (IRI) to the requesting entity,
where the referrer element includes a former destination URL of the client application,
where the first authenticity reference part is a uniformly chosen random, pseudorandom or otherwise hard to guess element,
where the second authenticity reference part is a uniformly chosen random, pseudorandom or otherwise hard to guess element that is independent from the first authenticity reference part.

13. A program storage device readable by machine, tangibly embodying a program of instructions executable by the machine to perform a method for providing identity-related information (IRI) to a requesting entity by means of an identity provider, wherein a client application is provided for the communication of a user with the requesting entity and with the identity provider, wherein the client application uses a first communication protocol, wherein the first communication protocol comprises a referrer function according to which a communication message comprises a referrer element with information about previous communication, said method comprising:
authenticating the user to the identity provider;
a first authenticity reference part generation step, comprising the generation of a first authenticity reference part by the identity provider;
a first authenticity reference communication step between the client application and the identity provider comprising the communication of the first authenticity reference part;
a second authenticity reference part generation step, comprising the generation of a second authenticity reference part by the identity provider based on verification of user delivered authentication information sent to the identity provider in response to said first authenticity reference part communicated to the client application;
a second authenticity reference communication step between the identity provider and the requesting entity, by means of the first communication protocol, comprising the communication of the second authenticity reference part and in the referrer element the communication of the first authenticity reference part;
a request step wherein the requesting entity sends one of the first and the second authenticity reference part, and a secure function of the first and the second authenticity reference part to the identity provider;
a removing step wherein the identity provider deletes information regarding the first and second authenticity reference parts from an identity provider database; and
a response step wherein the identity provider sends the identity related information (IRI) to the requesting entity, where the referrer element includes a former destination URL of the client application, where the first authenticity reference part is a uniformly chosen random, pseudorandom or otherwise hard to guess element, where the second authenticity reference part is a uniformly chosen random, pseudorandom or otherwise hard to guess element that is independent from the first authenticity reference part, where the first authenticity reference communication step delivers the first authenticity reference part to a current URL of the first communication protocol, and where the second authenticity reference communication step sends a redirect command to the client application and the client application sends a get request to the requesting entity.

14. A computer implemented method for providing identity-related information (IRI) to a requesting entity by means of an identity provider, wherein a client application is provided for the communication of a user with the requesting entity and with the identity provider, wherein the client application uses a first communication protocol, said method comprising:

checking, by a computing device, whether the first communication protocol comprises a referrer element with information about previous communication;

determining, by said computing device, if the first communication protocol comprises a referrer element;

authenticating, by a computing device, the user to the identity provider;

a first authenticity reference part generation step, comprising the generation, by said computing device, of a first authenticity reference part by the identity provider;

a first authenticity reference communication step between the client application and the identity provider comprising the communication, by said computing device, of the first authenticity reference part;

a second authenticity reference part generation step, comprising the generation, by said computing device, of a second authenticity reference part by the identity provider based on verification of user delivered authentication information sent to the identity provider in response to said first authenticity reference part communicated to the client application;

a second authenticity reference communication step between the identity provider and the requesting entity, by means of the first communication protocol, comprising the communication, by said computing device, of the second authenticity reference part and in the referrer element the communication of the first authenticity reference part;

a request step wherein the requesting entity sends one of the first and the second authenticity reference part, and a secure function of the first and the second authenticity reference part to the identity provider;

a removing step wherein the identity provider deletes information regarding the first and second authenticity reference parts from an identity provider database; and a response step wherein the identity provider sends the identity related information (IRI) to the requesting entity, where the referrer element includes a former destination URL of the client application, where the first authenticity reference part is a uniformly chosen random, pseudorandom or otherwise hard to guess element, where the second authenticity reference part is a uniformly chosen random, pseudorandom or otherwise hard to guess element that is independent from the first authenticity reference part, where the first authenticity reference communication step delivers the first authenticity reference part to a current URL of the first communication protocol, and where the second authenticity reference communication step sends a redirect command to the client application and the client application sends a get request to the requesting entity.

\* \* \* \* \*